R. PECK.
SEED HARVESTING ATTACHMENT FOR MOWING MACHINES.
APPLICATION FILED JULY 10, 1915.

1,190,454.

Patented July 11, 1916.

WITNESSES:

Ralph Peck, INVENTOR

BY

Attorney

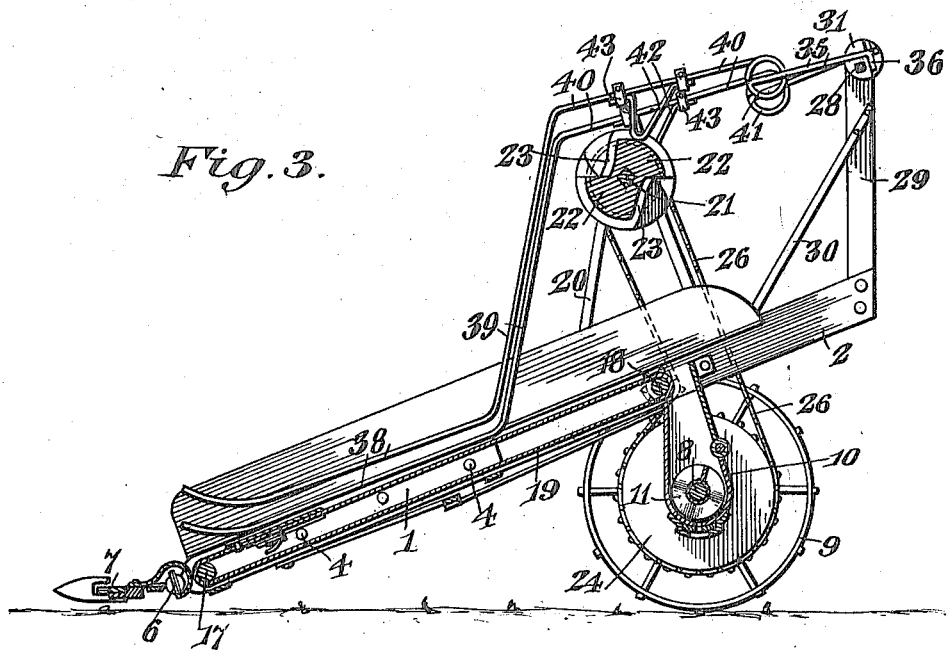
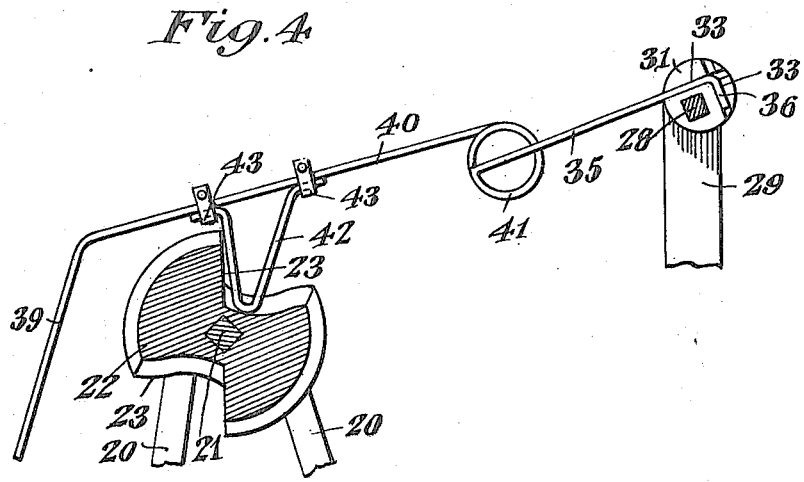

UNITED STATES PATENT OFFICE.

RALPH PECK, OF VICKSBURG, MISSISSIPPI.

SEED-HARVESTING ATTACHMENT FOR MOWING-MACHINES.

1,190,454. Specification of Letters Patent. Patented July 11, 1916.

Application filed July 10, 1915. Serial No. 39,151.

*To all whom it may concern:*

Be it known that I, RALPH PECK, citizen of the United States, residing at Vicksburg, in the county of Warren and State of Mississippi, have invented a new and useful Seed-Harvesting Attachment for Mowing-Machines, of which the following is a specification.

This invention relates to an improvement in seed harvesting attachments for mowing machines, and is an improvement on the construction set forth in my application for United States Letters Patent filed September 4, 1914, Serial No. 860,227.

The object of the present invention is to provide means for removing the seed or grain from the stalk after the grain has been severed, and as it traverses an endless conveyer.

A further object is in the provision of means for regulating the stroke of the various beaters, and another object is in the provision of means for actuating the beaters to produce the continuous beating or whipping of the grain or seed from the stalks.

The invention consists of certain novel features of construction and combinations of parts which will be hereinafter described and pointed out in the claims.

It will be evident that changes in the form, proportion, material and minor details of construction within the scope of the appended claims, may be made without departing from the spirit or sacrificing any of the advantages of this invention.

Figure 1:
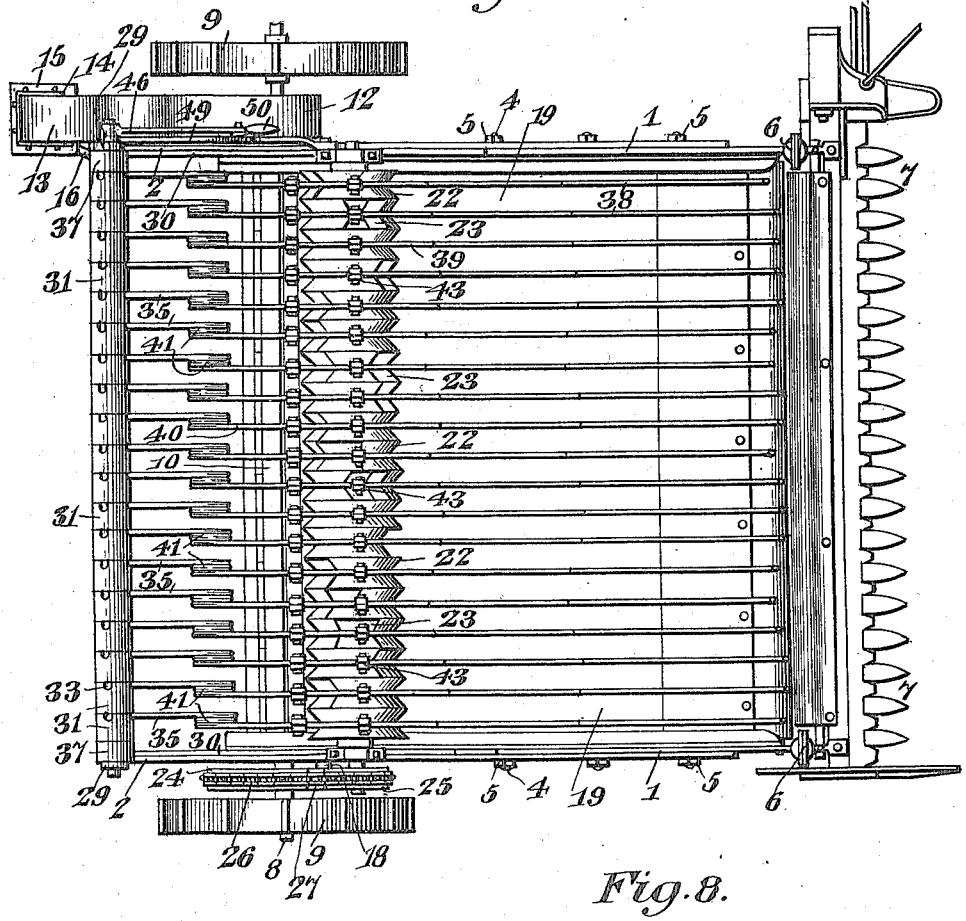
Figure 7:
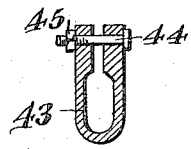
Figure 8:
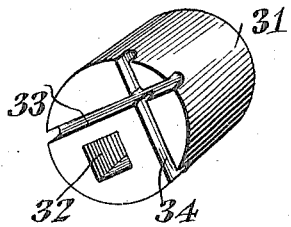
Figure 2:
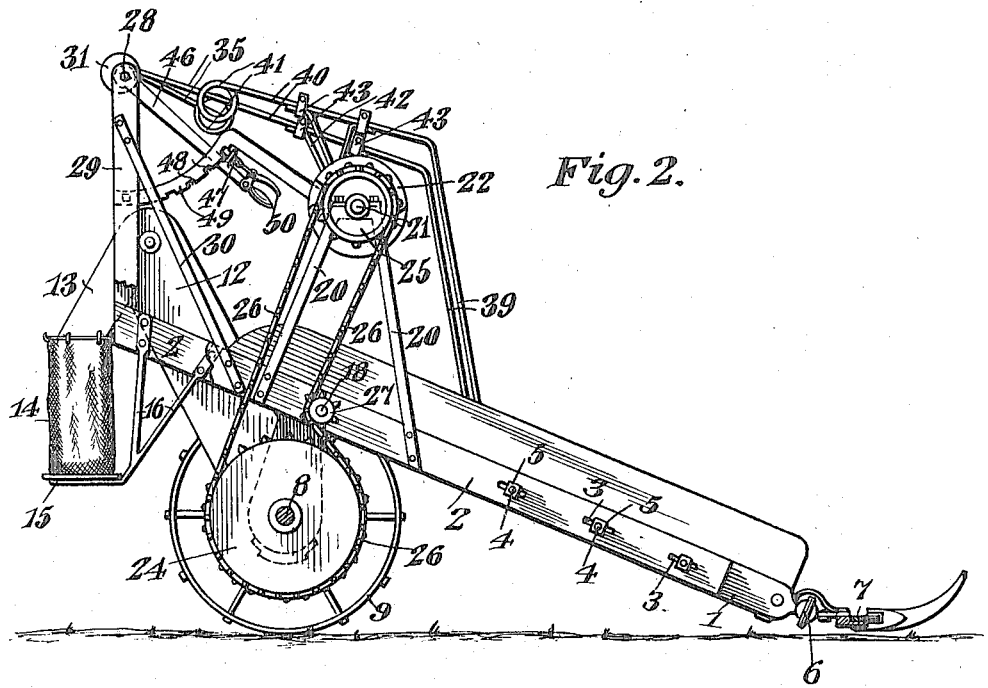
Figure 5:
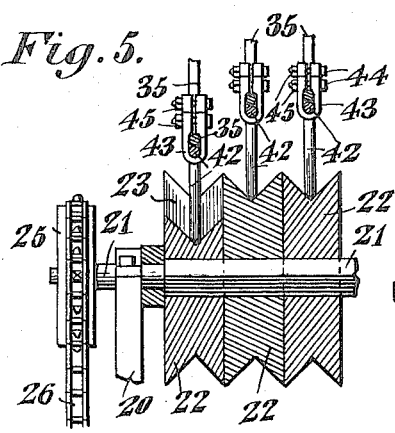
Figure 6:
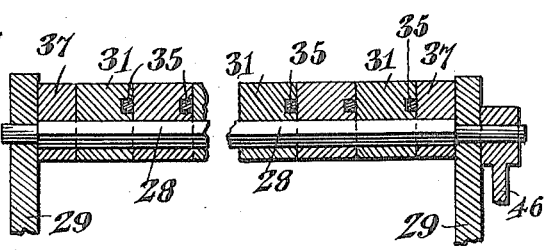

In the accompanying drawings,—Figure 1 is a top plan view disclosing the invention. Fig. 2 is a view in side elevation, one of the drive wheels being removed. Fig. 3 is a longitudinal vertical sectional view. Fig. 4 is an enlarged detail view showing the manner of mounting the beater, and showing one of the cams in section and the manner of operating the beater. Fig. 5 is a detail view of several of the cams and beaters in section. Fig. 6 is a longitudinal vertical sectional view through the locking means which fastens the beaters to the supporting shaft. Fig. 7 is a sectional view of a clip employed for fastening the arms to the beaters. Fig. 8 is a perspective view of one of the locking collars.

The frame of the attachment or apparatus consists of sides which are made in sections designated 1 and 2. The outer sections 2 are provided with elongated slots 3 through which bolts 4 extend for fastening the inner and front sections 1 adjustably together. Nuts 5 are screwed upon the bolts 4, for maintaining the bolts in position. The front sections are connected at their outer terminals by a flexible joint 6 to a cutting bar or mechanism 7 of a mowing machine not shown.

A transverse shaft or axle 8 has traction wheels 9, 9, mounted thereon, and surrounding the shaft is a trough 10 through the ends of which the axle 8 extends. The trough 10 is connected to the sections 2 of the frame for supporting the frame above the axle. A screw-conveyer 11 is mounted on the axle, for conveying the grain or seed longitudinally of the trough to an inclined conveyer casing 12, which is connected to the trough and through which the grain is conducted from the trough. A spout 13 is connected to the conveyer casing 12 for delivering the seed and grain into a sack 14 mounted on a platform 15, the platform being supported by a bracket 16 connected to one of the sections 2.

Front and rear transverse rolls 17 and 18 are connected to the sections 1 and 2 respectively, and mounted on and traveling over the rolls 17 and 18 is an endless conveyer or belt 19. The upper or rear terminal of the belt is located above the trough 10 into which the grain is discharged from the belt.

A-shaped standards 20 are connected to the sections 2 of the frame and mounted upon the standards is a transverse cam shaft 21. Mounted on the cam shaft 21 are a plurality of two-faced or double acting cams 22. The faces of the cams are preferably grooved and two notches 23 are formed in each cam. These notches are preferably V-shaped although one wall of each notch is preferably straight and the other slightly inclined. The faces of the several cams are arranged upon the shaft so that the notches 23 will not be in alinement.

A sprocket wheel 24 is mounted upon the shaft 8, and a sprocket wheel 25 is mounted upon the cam shaft 21. A sprocket chain 26 is mounted and travels over the sprocket wheels 24 and 25 for transmitting motion to the cam shaft 21, and a small sprocket wheel 27, mounted upon the upper or rear roll 18, is adapted to be engaged by the sprocket chain 26 for transmitting motion to the conveyer belt 19.

The cam shaft 21 is preferably square and the bores or openings in the cams are made square to fit the square shaft, so that the cams are held against movement upon the shaft and will be positively operated upon rotation of the cam shaft.

A transverse beater shaft 28 is supported upon the sections 2 of the frame by means of uprights or posts 29. Braces 30 connect the posts or uprights 29 to the sections 2, for affording additional strength to the posts. The beater shaft 28 is preferably made square and mounted upon the shaft are a plurality of locking collars or heads 31. Each collar or head is provided with a square eccentric opening 32, extending longitudinally thereof. In an end or face of each collar or head 31, are formed grooves or sockets 33 and 34 which intersect at their outer terminals, the grooved face of each head abutting against the closed or smooth face or end of an adjacent head or collar.

A plurality of beaters 35 are provided at their inner terminals with right-angular projections 36. The inner terminals of each beater 35 is received in the groove 33 of a collar or head 31, and a right-angular projection 36 of each beater is received in the intersecting groove 34 for firmly and securely locking each beater to a collar. After the several beaters have been connected or applied to the collars or heads 31, the collars or heads are forced together along the shaft 28, and confined between the posts 29. Filler blocks 37 are interposed between the outermost heads or collars and the posts 29, for maintaining the several collars or heads in close proximity, whereby the terminals of the beaters will be held in position.

The beater 35 consists of a striking portion 38, an upwardly inclined intermediate portion 39, and an upper rearwardly or inwardly extending portion 40. The inner upper portion 40 is provided near its inner terminal with a coil 41 for giving tension to the beaters and affording a certain resiliency to the beaters. Connected to the inner terminals or portions 40, in advance of the coils 41, are abutments or arms 42. The abutments or arms are made practically V-shaped, and the upper terminals are bent laterally or at right angles. Clips 43 engage the laterally extending terminals or ends of the arms for fastening them to the beaters 35. The clips are made U-shaped and the ends of the clips are drawn and held together by bolts 44 and nuts 45.

A lever 46 is connected to the square beater shaft 28 and is provided with a pawl 47 which is adapted to engage the teeth 48 of a segment 49, the segment being connected to one of the posts 29 and to one of the standards 20. A hand grip 50 is provided for actuating the pawl 47.

The tension of the beaters is regulated by the rotation of the shaft 28, and in this way the stroke of the beaters is controlled. In the operation of the apparatus the grain is severed by the severing means 7 and is conducted onto the traveling conveyer 19. The conveyer 19 is caused to travel by the power derived upon the rotation of the traction wheels 9, and through the sprocket wheels 24 and 25, and sprocket chain 26 and sprocket wheel 27 which engages the sprocket chain 26. The rotation of the sprocket wheel 25 causes the cam shaft 21 to rotate and as the cam shaft 21 is rotated the cams 22 are rotated causing the beaters 35 to be raised and lowered for producing a beating or whipping action for removing grain or seed from the stalks.

The raising and lowering of the beaters 35 is caused by the abutments or arms traveling over the faces of the double acting cams 22. The arms or abutments in traveling over the outer surfaces of either of the faces of the cams hold the beaters in their uppermost position, and as the cams continue to rotate the arms or abutments will fall into a notch 23 formed in the cams causing the beaters to fall, and as they fall into the notches the tension placed upon the beaters by the coils 41 and the adjustment of the shaft 46, will govern the stroke of the beaters. It may be a light or a hard stroke, this being regulated entirely by the grain or seed operated upon. The seed or grain as it is threshed from the stalks by the vibratory beaters 35 will pass along with the conveyer and be discharged at the rear or inner end of the conveyer into the transverse trough 10, and from there it is conducted by the screw-conveyer 11 and the inclined conveyer 12 to a sack or receptacle 14, where it may be discharged through the bottom of the trough by operating the slide valve 52.

From the foregoing it will be seen that I have provided an attachment for moving machines by which a plurality of vibratory beaters are provided for beating or whipping the grain or seed from the stalks as the stalks travel across the conveyer. The stroke of the beaters is regulated and controlled so that a light or heavy stroke may be obtained, and the various beaters are operated by means of cams so that some of the beaters are coming in contact with the conveyer at all times, that is all of the beaters are not operated simultaneously for causing them to strike the conveyer in unison. To every revolution of the cams and cam shaft the beaters receive two strokes.

What is claimed is—

1. In a seed harvester, a frame, a plurality of vibratory beaters for removing seed from the grain, and having angularly turned projections upon their inner ends, a plurality of independent supporting members having abutting faces provided with angular slots for the reception of the inner ends and angular projections of said vibratory beaters, and means for securing said members in abutting relation to secure said beaters rigidly in the angular slots of said members.

2. A seed harvester comprising a conveyer frame, an endless conveyer mounted on the frame upon which the severed material is received, a plurality of vibratory beaters for removing the grain from the severed material as it is fed across the endless conveyer, means for actuating the beaters, a transverse shaft, eccentric means mounted on the shaft for connecting the inner terminals of the beaters thereto, and means for adjusting the shaft for regulating the stroke of the beaters.

3. A seed harvester comprising a conveyer frame having an endless conveyer mounted thereon, a plurality of vibratory beaters for removing the grain from the severed material, means for actuating the beaters, a transverse shaft, a plurality of eccentrically mounted collars on the shaft, said collars confining the inner terminals of the beaters therebetween for fastening them to the shaft, and means for adjusting the shaft for regulating the stroke of the beaters.

4. A seed harvester comprising a frame, a plurality of vibratory beaters for removing the seed from the grain, a transverse shaft, a plurality of eccentrically mounted collars on the shaft, each collar having intersecting grooves on one face thereof, each beater provided with an angular projection at the inner terminal thereof, each of said beaters having the angular projection and the inner terminal thereof received in the grooves of a collar for fastening the beaters to the shaft.

5. A seed harvester comprising a frame, a plurality of vibratory beaters mounted thereon for removing the grain from the severed material, means for actuating the beaters, a transverse shaft, collars mounted on the shaft, each collar provided with intersecting grooves on one face thereof, the inner terminals of said beaters received in the intersecting grooves of the collars for fastening the beaters to the shaft, and means for adjusting the shaft for regulating the stroke of the beaters.

6. A seed harvester comprising a frame, a plurality of beaters mounted on the frame for removing the seed from the severed material, a shaft mounted on the frame, a plurality of collars eccentrically mounted on the shaft capable of longitudinal movement thereon, each collar having intersecting grooves in one face thereof, the inner terminal of the beaters received in the intersecting grooves of the collars, and each terminal of the beaters maintained in the grooves by the face of the adjacent collar.

7. A seed harvester comprising a frame, a plurality of beaters mounted on the frame, a square shaft, a plurality of collars having square openings therein through which the shaft extends, said collars each provided with intersecting grooves on one face thereof, the inner terminals of the beaters received in the intersecting grooves of the collars, for fastening the beaters to the shaft, a lever connected to the shaft, a segment connected to the frame coöperating with said lever for regulating the stroke of the beaters, and double acting cams for actuating the beaters.

8. In a seed harvester, a frame, a plurality of vibratory beaters for removing seed from the grain, a transverse shaft, a plurality of collars slidable on the shaft, and having sockets in one face for the reception of the inner ends of said beaters, and having flat opposite faces, and means for securing the collars in abutting relation on the shaft to engage the flat faces against the sockets to close the same and confine the inner ends of the beaters between the collars.

9. In a seed harvester, a frame, a plurality of vibratory beaters arranged over the frame, a transverse shaft, a row of collars mounted on the shaft to turn therewith and slide longitudinally thereon, each collar having a socket in one face thereof to receive the inner end of a beater, and having flat socket-closing opposite faces, and means for securing the collars together to bring the opposed faces of the adjacent walls against the sockets to confine the ends of the beaters therein.

10. In a seed harvester, a frame, a transverse shaft in the frame, a plurality of yieldable beaters fixed upon the shaft, cams for actuating the beaters, a hinged lever secured to the shaft for turning the same to adjust the tension of the beaters, and a segment for the hand lever to lock the same in adjusted position.

11. A seed harvester comprising a frame, a shaft mounted thereon, a plurality of collars mounted on the shaft, a plurality of vibratory beaters connected to the collars and rigidly held on the shaft, a cam shaft mounted on the frame, irregularly arranged double acting cams mounted on the cam shaft, V-shaped arms connected to the beaters engaging the cams, clips for connecting the V-shaped arms to the beaters, and means for rotating the cam shaft for operating the beaters and causing the beaters to receive two complete movements to each revolution of the cam shaft.

12. A seed harvester comprising a frame, a shaft connected thereto, a plurality of vibratory beaters having coils formed at the inner terminals thereof, collars mounted on the shaft having grooves formed in a face of each collar, said beaters having the inner terminals thereof received in the grooves of the collars for rigidly connecting the inner terminals of the beaters to the shaft, means connected to the shaft for regulating the stroke of the beaters, a cam shaft, a plurality of irregularly arranged double acting cams mounted on the shaft, arms connected to the beaters in advance of the coils, means for connecting the arms to the beaters, and means for rotating the cam shaft for imparting movement to the arms thereby causing the beaters each to receive two complete strokes to each revolution of the cam shaft.

13. The combination with a frame having rollers mounted thereon, an endless conveyer mounted on the rollers, of a transverse shaft, grooved collars eccentrically mounted upon the shaft, a plurality of beaters having their inner terminals received in the grooves of the collars for confining and fastening the beaters to the shaft, a cam shaft mounted on the frame, a plurality of double acting cams mounted on the shaft, arms or abutments mounted on the beaters engaging the cams, and means for transmitting motion to the endless conveyer and cam shaft whereby the beaters will receive two strokes to each revolution of the cam shaft for removing the grain from the stalks as it traverses the endless conveyer.

14. The combination with a frame and a drive shaft thereon, rollers mounted on the frame, a belt mounted on the rollers, of a plurality of vibratory beaters for removing the grain from the stalks as it traverses the belt, a shaft, means for rigidly connecting the inner terminals of the beaters to the shaft, means connected to the shaft for regulating the stroke of the beaters, a cam shaft having a sprocket wheel thereon, irregularly arranged double acting cams mounted on the cam shaft, arms or abutments mounted on the beaters engaging the cams, sprocket wheels mounted on one of the rollers and drive shaft, and a sprocket chain connecting the sprocket wheels of the axle, roller and cam shaft for imparting motion to the belt and beaters, whereby the beaters are operated and receive two strokes to each revolution of the cam shaft.

In testimony that I claim the foregoing as my own, I have hereto affixed my signature in the presence of two witnesses.

RALPH PECK.

Witnesses:
P. C. CANIZARO,
PAT HENRY.

Copies of this patent may be obtained for five cents each, by addressing the "Commissioner of Patents, Washington, D. C."